(12) United States Patent
Dürr et al.

(10) Patent No.: US 11,697,499 B2
(45) Date of Patent: Jul. 11, 2023

(54) METHOD FOR TRANSPORTING A RESCUE DEVICE FROM AN AERIAL VEHICLE TO A PERSON TO BE RESCUED, RESCUE SYSTEM FOR RESCUING A PERSON TO BE RESCUED, AND UNMANNED AERIAL VEHICLE FOR TRANSPORTING A RESCUE DEVICE FROM AN AERIAL VEHICLE TO A PERSON TO BE RESCUED

(71) Applicant: Sony Corporation, Tokyo (JP)

(72) Inventors: Peter Dürr, Stuttgart (DE); Henrik Schäfer, Stuttgart (DE); Bi Wang, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 408 days.

(21) Appl. No.: 16/944,177

(22) Filed: Jul. 31, 2020

(65) Prior Publication Data

US 2021/0053684 A1 Feb. 25, 2021

(30) Foreign Application Priority Data

Aug. 22, 2019 (EP) ..................................... 19193148

(51) Int. Cl.
| | | |
|---|---|---|
| *B64D 1/00* | (2006.01) | |
| *B64D 1/22* | (2006.01) | |
| *B64C 39/02* | (2023.01) | |
| *B64D 47/08* | (2006.01) | |
| *B64D 5/00* | (2006.01) | |

(Continued)

(52) U.S. Cl.
CPC ................ *B64D 1/22* (2013.01); *B64C 27/04* (2013.01); *B64C 39/024* (2013.01); *B64D 5/00* (2013.01);

(Continued)

(58) Field of Classification Search
CPC .. B64D 1/22; B64D 5/00; B64D 47/08; B64C 27/04; B64C 39/024; B64C 2201/027;
(Continued)

(56) References Cited

U.S. PATENT DOCUMENTS

| | | | | |
|---|---|---|---|---|
| 8,857,754 B2 * | 10/2014 | Ferrari | ...................... | B64D 1/22 244/2 |
| 9,745,062 B2 * | 8/2017 | Richardson | .............. | B64D 1/02 |

(Continued)

FOREIGN PATENT DOCUMENTS

| | | | |
|---|---|---|---|
| CN | 204701767 U | * | 10/2015 |
| CN | 204701767 U | | 10/2015 |

(Continued)

*Primary Examiner* — Peter D Nolan
*Assistant Examiner* — Peter Y Ning
(74) *Attorney, Agent, or Firm* — Xsensus LLP (57) ABSTRACT

A method for transporting a rescue device from an aerial vehicle to a person to be rescued includes launching an unmanned aerial vehicle from the aerial vehicle having an end portion releasable attached to the unmanned aerial vehicle via a first connection and a second connection. The method further includes enabling the person to be rescued to reach the end portion of the rescue device. and determining whether the end portion of the rescue device is released from the first connection. If the rescue device is released determining at the unmanned aerial vehicle whether the person to be rescued is safely attached to the rescue device. If so, the method comprises either releasing the rescue device from the second connection, or deactivating the unmanned aerial vehicle such that the unmanned aerial vehicle remains attached to the rescue device via the second connection.

20 Claims, 3 Drawing Sheets

(51) Int. Cl.
  *B64C 27/04*  (2006.01)
  *B64F 1/20*  (2006.01)
  *G05D 1/10*  (2006.01)
  *G05D 1/12*  (2006.01)
  *B64U 10/13*  (2023.01)
  *B64U 50/34*  (2023.01)
  *B64U 70/20*  (2023.01)
  *B64U 101/00*  (2023.01)
  *B64U 101/30*  (2023.01)

(52) U.S. Cl.
  CPC .............. *B64D 47/08* (2013.01); *B64F 1/20* (2013.01); *G05D 1/106* (2019.05); *G05D 1/12* (2013.01); *B64U 10/13* (2023.01); *B64U 50/34* (2023.01); *B64U 70/20* (2023.01); *B64U 2101/00* (2023.01); *B64U 2101/30* (2023.01); *B64U 2201/20* (2023.01)

(58) Field of Classification Search
  CPC .......... B64C 2201/06; B64C 2201/082; B64C 2201/12; B64C 2201/127; B64C 2201/146; B64C 2201/123; B64C 2201/128; B64C 2201/206; B64F 1/20; G05D 1/106; G05D 1/12; G05D 1/0866
  See application file for complete search history.

(56) References Cited

U.S. PATENT DOCUMENTS

| | | | |
|---|---|---|---|
| 9,915,945 B2* | 3/2018 | Fox | G01S 19/17 |
| 10,266,266 B2* | 4/2019 | Sopper | B66D 5/026 |
| 10,519,013 B2* | 12/2019 | Curran | B64D 1/08 |
| 10,988,257 B2* | 4/2021 | von Flotow | B64C 27/14 |
| 11,037,089 B2* | 6/2021 | Ruxton | G06Q 10/0832 |
| 11,312,492 B1* | 4/2022 | von Flotow | B64U 10/13 |
| 2012/0152654 A1* | 6/2012 | Marcus | E06C 5/26 182/129 |
| 2014/0353422 A1* | 12/2014 | Westbrook, Sr. | B64D 9/00 244/17.21 |
| 2016/0340006 A1* | 11/2016 | Tang | B64C 39/024 |
| 2017/0369167 A1* | 12/2017 | Meadow | G06Q 50/30 |
| 2019/0061943 A1* | 2/2019 | Azeredo | D07B 1/0673 |
| 2019/0135437 A1* | 5/2019 | Halevy | B64D 1/12 |
| 2021/0269149 A1* | 9/2021 | Culver | B64U 50/34 |
| 2021/0276675 A1* | 9/2021 | Ökvist | G06N 20/00 |

FOREIGN PATENT DOCUMENTS

| | | | | |
|---|---|---|---|---|
| CN | 109248390 A | | 1/2019 | |
| WO | WO-2010010420 A1 | * | 1/2010 | .............. B64D 1/22 |
| WO | WO-2014080387 A2 | * | 5/2014 | ........... B64C 39/024 |

* cited by examiner

METHOD FOR TRANSPORTING A RESCUE DEVICE FROM AN AERIAL VEHICLE TO A PERSON TO BE RESCUED, RESCUE SYSTEM FOR RESCUING A PERSON TO BE RESCUED, AND UNMANNED AERIAL VEHICLE FOR TRANSPORTING A RESCUE DEVICE FROM AN AERIAL VEHICLE TO A PERSON TO BE RESCUED

CROSS-REFERENCE TO RELATED APPLICATION

The present application claims priority to European Patent Application 19193148.4 filed by the European Patent Office on Aug. 22, 2019, the entire contents of which being incorporated herein by reference.

FIELD

The present disclosure relates to rescue of persons. In particular, examples relate to a method for transporting a rescue device from an aerial vehicle to a person to be rescued, a rescue system for rescuing a person to be rescued, and an Unmanned Aerial Vehicle (UAV) for transporting a rescue device from an aerial vehicle to a person to be rescued.

BACKGROUND

Rescuing human beings from difficult to access areas like steep mountain sites or tall buildings is very challenging. Rescue operations from an aerial vehicle such as a helicopter are difficult in these cases since the helicopter often cannot get close enough to the side of a building or a steep rock face. Accordingly, it is impossible to simply lower a rope for picking up people.

The choice of vessels for, e.g., mountain rescue is therefore conventionally limited to small helicopters. However, a small helicopter is only able to carry one or more passengers in addition to the helicopter (rescue) crew. For rescuing a group of people, several helicopter flights are necessary.

Hence, there is a desire for an improved technique for rescuing persons.

SUMMARY

This desire is met by apparatuses and methods in accordance with the independent claims. Advantageous embodiments are addressed by the dependent claims.

According to a first aspect, the present disclosure provides a method for transporting a rescue device from an aerial vehicle to a person to be rescued. The rescue device is attached to the aerial vehicle. The method comprises launching an UAV from the aerial vehicle. An end portion of the rescue device is attached to the UAV via a first connection and a second connection. The end portion of the rescue device is releasable by the person to be rescued from the first connection for handover. The method further comprises approaching the person to be rescued by the UAV in order to enable the person to be rescued to reach the end portion of the rescue device. Additionally, the method comprises determining at the UAV whether the end portion of the rescue device is released from the first connection. If it is detected that the rescue device is released from the first connection, the method comprises determining at the UAV whether the person to be rescued is safely attached to the rescue device. Further, if it is detected that the person to be rescued is safely attached to the rescue device, the method comprises either releasing the rescue device from the second connection, or deactivating the UAV such that the UAV remains attached to the rescue device via the second connection.

According to a second aspect, the present disclosure provides a rescue system for rescuing a person to be rescued. The rescue system comprises an aerial vehicle and a rescue device attached to the aerial vehicle. Further, the rescue system comprises an UAV. An end portion of the rescue device is attached to the UAV via a first connection and a second connection. The end portion of the rescue device is releasable by the person to be rescued from the first connection for handover. The UAV is configured to launch from the aerial vehicle, and approach the person to be rescued in order to enable the person to be rescued to reach the end portion of the rescue device. Further, the UAV is configured to determine whether the end portion of the rescue device is released from the first connection. If it is detected that the rescue device is released from the first connection, the UAV is configured to determine whether the person to be rescued is safely attached to the rescue device. Further, if it is detected that the person to be rescued is safely attached to the rescue device, the UAV is configured to either release the rescue device from the second connection, or deactivate itself such that the UAV remains attached to the rescue device via the second connection.

According to a third aspect, the present disclosure provides an UAV for transporting a rescue device from an aerial vehicle to a person to be rescued. The UAV comprises a first connection and a second connection for attaching an end portion of the rescue device to the UAV. The end portion of the rescue device is releasable by the person to be rescued from the first connection for handover. Further, the UAV comprises a processing circuit configured to control the UAV to perform the following: launch from the aerial vehicle; approach the person to be rescued in order to enable the person to be rescued to reach the end portion of the rescue device; determine whether the end portion of the rescue device is released from the first connection; and if it is detected that the rescue device is released from the first connection, determine whether the person to be rescued is safely attached to the rescue device. If it is detected that the person to be rescued is safely attached to the rescue device, the processing circuit is further configured to control the UAV to perform the following: release the rescue device from the second connection; or deactivate itself such that the UAV remains attached to the rescue device via the second connection.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
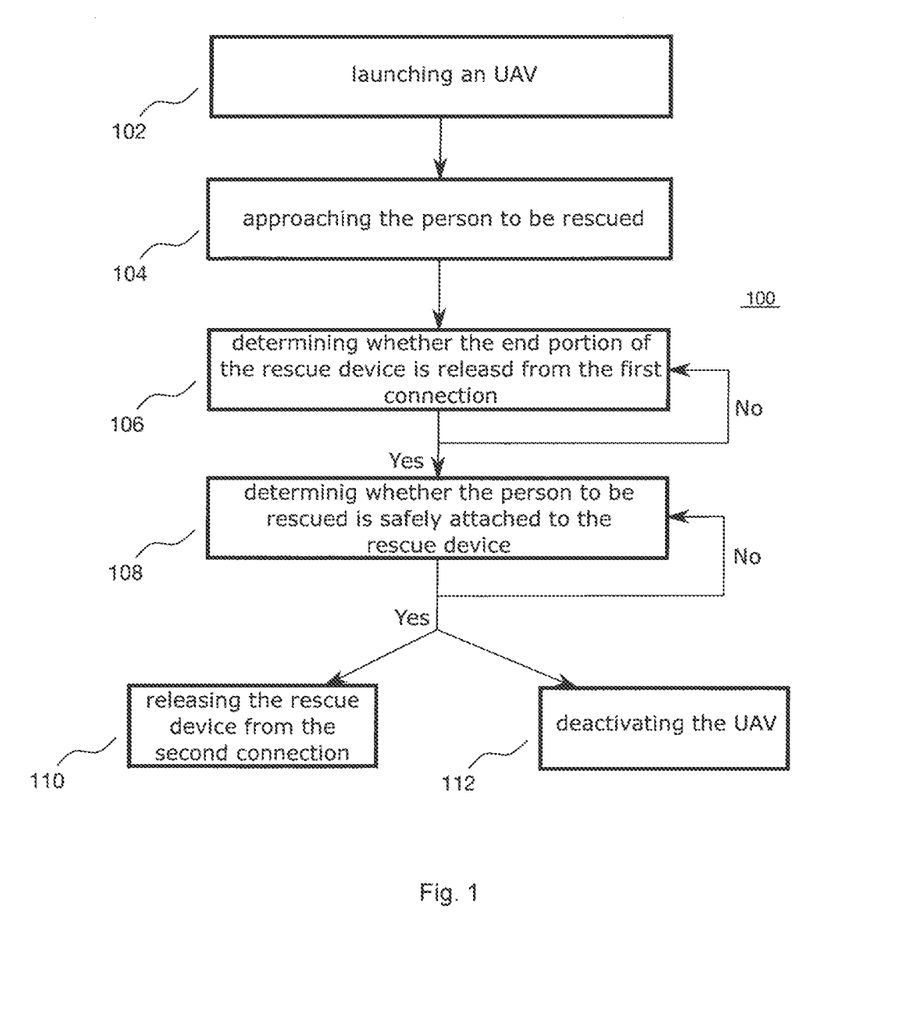
FIG. 1 illustrates a flowchart of an example of a method for transporting a rescue device from an aerial vehicle to a person to be rescued.

FIG. 1 illustrates a flowchart of a method 100 for transporting a rescue device from an aerial vehicle to a person to be rescued. The person to be rescued is a person that needs to be rescued from a dangerous (emergency) situation. For example, the person to be rescued may be waiting for help at a hard to reach location such as a steep mountain site or a tall building.

The rescue device is attached to the aerial vehicle and allows to transfer/move the person to be rescued into the aerial vehicle. For example, the rescue device may be a rope or a (rope) ladder.

The aerial vehicle may, e.g., be a helicopter. However, it is to be noted that the aerial vehicle is not limited to a helicopter. In general, the aerial vehicle may be any type of aircraft that allows to accommodate plural persons.

Method 100 comprises launching (starting) 102 an UAV (e.g. a drone such as a bicopter or a quadcopter) from the aerial vehicle. An end portion of the rescue device is attached to the UAV via a first connection and a second connection. The end portion of the rescue device is releasable by the person to be rescued from the first connection for handover. In other words, the UAV comprises a dual connection for attaching the rescue device to the UAV. While one end of the rescue device is attached to the aerial vehicle, the other end of the rescue device is attached to the UAV via the first connection and the second connection. The second connection is firm to connect the end portion of the rescue device to the UAV. The first connection is less firm such that the end of the rescue device that is to be handed over to the person to be rescued can be released by the person to be rescued. For example, a drone may be started from larger aerial vehicle such as helicopter into a self-propelled flight with a rope attached thereto.

Further, method 100 comprises approaching 104 the person to be rescued by the UAV in order to enable the person to be rescued to reach the end portion of the rescue device. In other words, the UAV transports the end portion of the rescue device from the aerial vehicle to the person to be rescued such that the person to be rescued can access the rescue device. For example, the UAV may get closer to the person to be rescued autonomously or remote controlled until the loose end of the rope can be reached by the person.

Method 100 subsequently comprises determining 106 at the UAV whether the end portion of the rescue device is released from the first connection. In other words, the UAV determines whether the person to be rescued was able to grasp the end portion of the rescue device and release it from the first connection. That is, handover of the rescue device is monitored. As indicated in FIG. 1, determining 106 whether the end portion of the rescue device is released from the first connection may be performed repeatedly if it is determined that the rescue device is not (yet) released from the first connection. For example, the UAV may hover in range of the person to be rescued until the rope was grabbed successfully (confirmation may, e.g., be remote or autonomous). The UAV may, e.g., monitor via one or more sensors if the rescue device is released from the first connection (e.g. by monitoring a state of the first connection).

If it is detected that the rescue device is released from the first connection, method 100 comprises determining 108 at the UAV whether the person to be rescued is safely attached to the rescue device. In other words, safe attachment of the rescue device to the person to be rescued is monitored. As indicated in FIG. 1, determining 108 whether the person to be rescued is safely attached to the rescue device may be performed repeatedly if it is determined that the person to be rescued is not (yet) safely attached to the rescue device. For example, the UAV may hover close to the person to be rescued until the rope is safely attached to person to be rescued.

If it is detected that the person to be rescued is safely attached to the rescue device, method 100 comprises either releasing 110 the rescue device from the second connection such that the UAV is no longer attached to the rescue device, or alternatively deactivating 112 the UAV such that the UAV remains attached to the rescue device via the second connection. For example, the UAV may release the rope from second holding point or go into a recovery mode (deactivate UAV) such that the person to be rescued may be reeled into the helicopter via the rope. That is, evacuation of the person to be rescued in initiated once it is determined that the person to be rescued is safely attached to the rescue device.

Method 100 may allow to safely and reliable deliver a rescue device such as a rope or a ladder to a person to be rescued. For example, if the person to be rescued is at a location that is hard to reach or even impossible to reach for the aerial vehicle itself or with other conventional rescue methods, the delivery of the rescue device via the UAV may allow to drastically increase the efficiency of the rescue operation.

Further, method 100 may allow to use aerial vehicles with more capacity (i.e. with the ability to transport a greater number of persons) since the aerial vehicle itself may operate from a relatively large distance to the location of the person to be rescued. Therefore, also groups of people may be rescued by repeatedly performing method 100 such that the people are one by one transferred into the aerial vehicle. Therefore, the number of trips of the aerial vehicle to the location of the group of people to be rescued may be reduced compared to conventional approaches. The time required to rescue the persons may thus be considerably reduced.

Further, if the aerial vehicle is a helicopter, the amount of downwind produced close to the person(s) in the emergency situation may be reduced such that the emergency procedure is less hazardous compared to conventional approaches. For example, if a person is to be rescued from a burning building, the (down-) wind and turbulences of an approaching helicopter may increase the intensity of the fire. By using the UAV for transporting the rescue device to the person in the burning building, the helicopter may stay at a larger distance to the burning building such that the wind and the turbulences of the helicopter affect the fire less.

Figure 2:
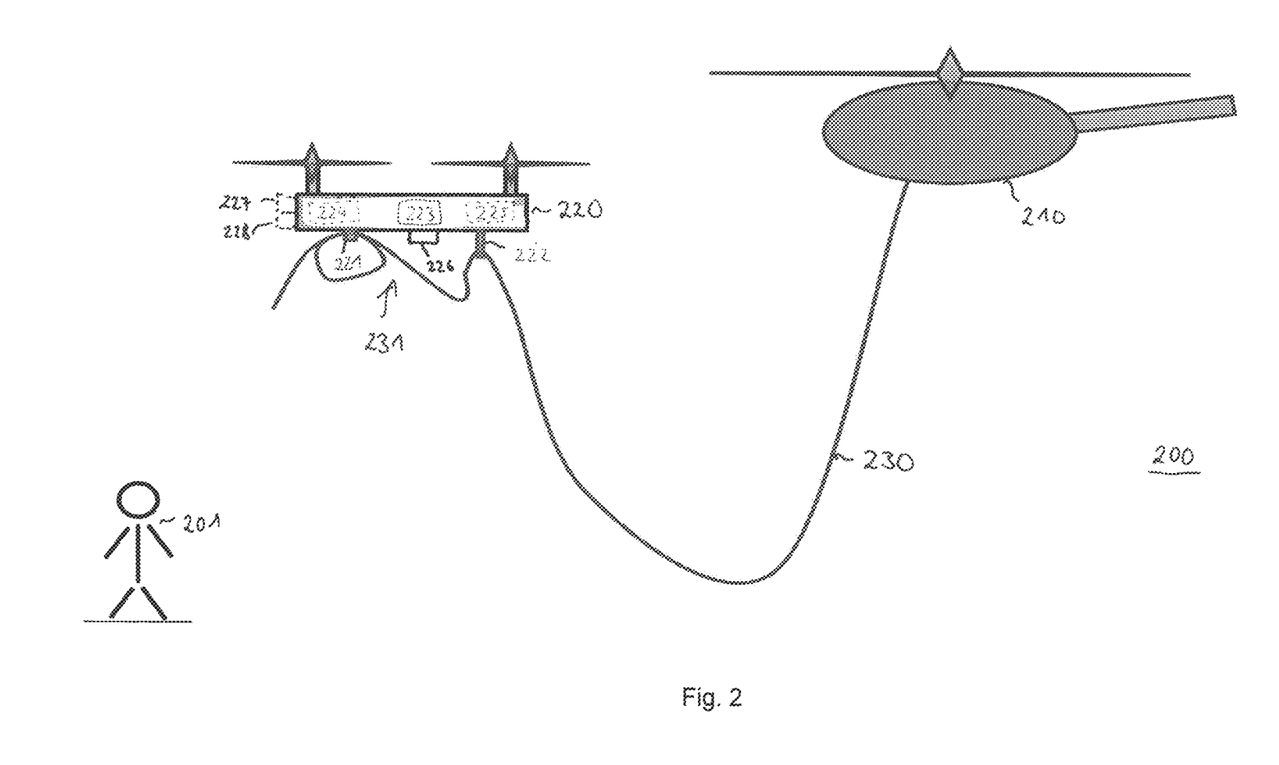
FIG. 2 illustrates an example of a rescue system for rescuing a person to be rescued.
Figure 3:
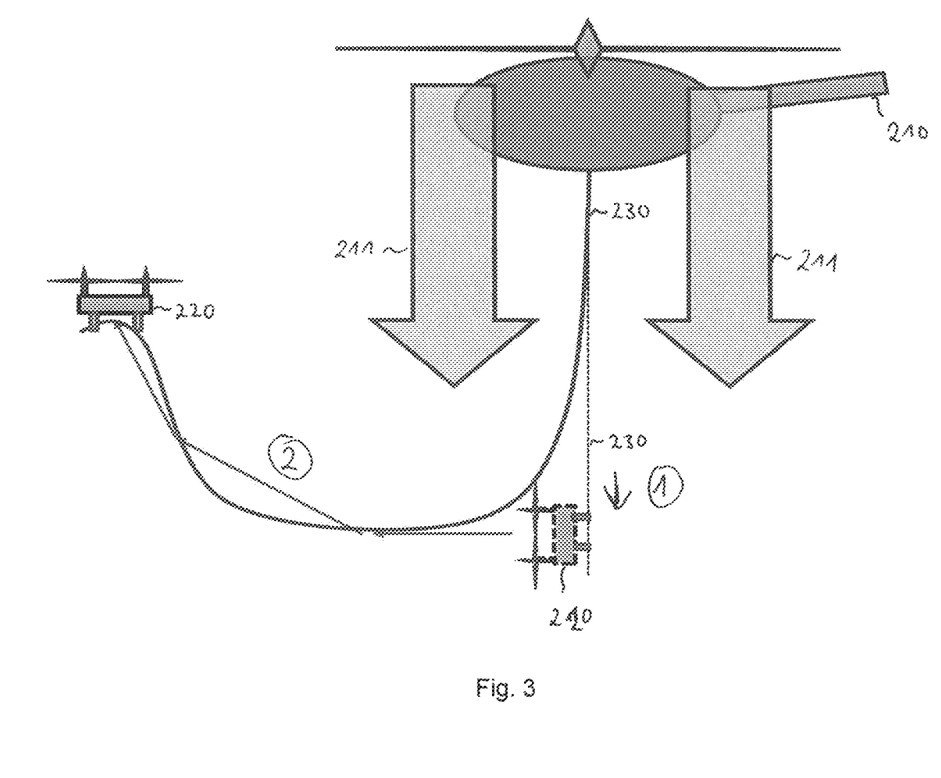
FIG. 3 illustrates an example of a launching procedure of an UAV.

Further aspects of method 100 will be described in the following with respect to an exemplary rescue system 200 for rescuing a person 201 as illustrated in FIGS. 2 and 3.

The rescue system 200 illustrated in FIG. 2 comprises an aerial vehicle 210 and an UAV 220. Further, the rescue system 200 comprises a rescue device, which is depicted as a rope 230 in FIG. 2. The rope 230 is (fixedly) attached to the aerial vehicle 210. Further, an end portion 231 of the rope 230 is attached to the UAV 220 via a first connection 221 and a second connection 222.

The UAV 220 is initially arranged in or at the aerial vehicle 210 and is launched from the aerial vehicle 210 once the aerial vehicle 210 has reached a certain distance or a certain distance range to the person 201.

An exemplary launching procedure is illustrated in FIG. 3. First, the UAV 220 is lowered with respect to the aerial vehicle 210 by means of the rope 230 to position the UAV 220 at a lowered position with respect to the aerial vehicle 210. In other words, the UAV 220 is positioned under the aerial vehicle 210 at a lower altitude such that the UAV 220 is affected less by the downwind 211 created by the rotor(s) of the aerial vehicle 210.

Then, the UAV 220 is launched sideways from the lowered position such that the UAV 220 moves out of the downwind. Accordingly, the UAV 220 may avoid flying through the very strong downwind close to the aerial vehicle 210's rotor(s).

In some examples, the UAV 220 may receive from the aerial vehicle 210 information about one or more operation parameters of the aerial vehicle 210 that enable the UAV 220 to estimate (determine) the UAV 220's downwind (e.g. information about a rotor speed). Accordingly, the UAV 220 estimates the downwind created by the aerial vehicle 210 based on the information about the one or more operation parameters of the aerial vehicle 210 and controls its movement for launching sideways based on the estimated downwind.

Further, a distance between the UAV 220 and the aerial vehicle 210 may be determined (estimated) and used by the UAV 220 for estimating the downwind. For example, the aerial vehicle 210 may comprise a motion tracking system to estimate the distance of the UAV 220 to the aerial vehicle 210, and subsequently communicate distance information to the UAV 220. In other examples, one of the UAV 220 and the aerial vehicle 210 may use an Ultra-WideBand (UWB) based radar to determine the distance of the UAV 220 to the aerial vehicle 210. In still further examples, one of the UAV 220 and the aerial vehicle 210 may use a computer vision system to determine the distance of the UAV 220 to the aerial vehicle 210.

The UAV 220 uses a control software for controlling its movement. The UAV 220 comprises a processing circuit 223 configured to control the UAV 220 by executing the control software. For example, the processing circuit 223 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuit 223 may optionally be coupled to, e.g., read only memory (ROM) for storing software, random access memory (RAM) and/or non-volatile memory. The UAV 220 may further comprise other hardware—conventional and/or custom.

In some examples, the control software may further take into account physics/physical effects/dynamics of the attached rescue device such as the rope 230 (e.g. aerodynamics, weight, inertia, etc.) for controlling the movement of the UAV 220.

Once the UAV 220 launched from the aerial vehicle, it approaches the person 201 to be rescued. Safely approaching the person 201 in the emergency situation may be done in many different ways. Some examples will be given in the following.

For example, if the UAV 220 is remote controlled by a human operator via a remote control in the aerial vehicle, the UAV 220 receives control signals from the remote control and controls its movement based on the control signals. Accordingly, the UAV 220 is approaching the person 201 based on the remote control signals of the human operator.

In other examples, if an emergency beacon such as an avalanche beacon is attached to the person 201, the UAV 220 receives a signal from the emergency beacon and (autonomously) control its movement based on the received signal. For example, the UAV 220 may determine a direction of signal propagation and/or a signal strength of the emergency beacon's signal and use this information to autonomously approach the person 201.

In some example, the UAV 220 comprises a human detection system 224. The human detection system 224 is a system capable of detecting a human being in sensor data of its environment. For example, the human detection system 224 may comprise an optical camera, a thermal imaging camera, a radar sensor, a LiDAR sensor, etc. for sensing its environment. Based on the captured sensor data, the human detection system 224 determines presence of a human being. When the human detection system 224 detects the person 201, the human detection system 224 determines position information about an absolute position of the person 201 or a relative position of the person 201 with respect to the UAV 220. The UAV 220 (autonomously) controls its movement based on the position information.

Some buildings (e.g. tall buildings such as skyscrapers) comprise markers indicating emergency exits (e.g. emergency exit windows) of the building. These markers are detectable by the UAV 200 and used for navigation/maneuvering. A marker indicating an emergency exit of a building may be implemented in many ways. For example, it may be an optical marker visible for an optical camera, a marker that is invisible for human beings but visible for, e.g., an infrared camera, or the marker may be a radio frequency transponder. Accordingly, the UAV 220 comprises in some examples a marker detection system 225 comprising one or more sensors for sensing the environment (e.g. an optical camera, an infrared camera, a radio frequency receiver, etc.) and a corresponding recognition circuitry (e.g. running a recognition algorithm) for recognizing the marker in the sensor data.

If the person 201 is located at an emergency exit of a building, the UAV 220 detects the marker indicating the emergency exit using the marker detection system 225 and (autonomously) controls its movement in order to approach the marker or a position indicated by the marker.

Once the UAV 220 has approached the person 201, the person 201 may simply grab/grasp the end portion 231 of the rope 230 as it is releasably attached to the UAV 220 via the first connection 221. Accordingly, the rope 230 may be handed over to the person 201 in a fail safe manner. For example, the first connection 201 may be configured to (automatically) release the end portion 231 of the rope 230 on pull (i.e. if a pulling force is applied on the first connection 201 via the rope 230). In other words, the UAV 220 is equipped with a system that recognizes grabbing of the rope 230 by the person 201 in order to initiate the release of the rope 230 from the first connection 221.

After the end portion of the rope 230 is released from the first connection 221, the UAV 220 determines whether the person 201 is safely attached to the rope 230. The determination whether the person 201 is safely attached to the rope 230 may be done in many different ways. Some examples will be given in the following.

In some examples, the UAV comprises a user input device 226 (e.g. a button, a switch, a touchscreen etc.) for acknowledging safe attachment to the rope 230. Accordingly, the UAV 220 determines that the person 201 is safely attached to the rope 230 if a user input is received at the user input device 226.

In other examples, a human operator such as an operator of the UAV 220 or a member of the rescue team in the aerial vehicle 210 may decide whether the person 201 is safely attached to the rope 230 and instruct the UAV 220 via a corresponding acknowledgment signal. Accordingly, the UAV 220 determined that the person 201 is safely attached to the rescue device if the acknowledgment signal is received from, e.g., the aerial vehicle 210 or a remote control of the UAV 220.

As described above in connection with method 100, the UAV 220 releases the rope 230 from the second connection 222 if it is determined that the person 201 is safely attached to the rope 230 such that the rope 230 is no longer attached/connected to the UAV 200. After releasing the rope 230 from the second connection 222, the UAV 220 may, e.g., autonomously move to a predefined pick-up position. In alternative examples, the UAV 220 may return to the aerial vehicle 210. When returning to the aerial vehicle 210, the UAV 220 moves to a lowered position with respect to the aerial vehicle 210 (i.e. a position under the aerial vehicle), and subsequently attaches to a pick-up element (such as a rope, a net, etc.) of the aerial vehicle 210 at the lowered position. In other words, the return of the UAV 220 to the aerial vehicle 210 may be substantially inverse to the launch of the UAV 220 from the aerial vehicle 210.

Instead of releasing the rope 230, the UAV 220 may alternatively deactivate itself such that the UAV 220 remains attached to the rope 230 via the second connection 222. Accordingly, the UAV 220 is reeled into the aerial vehicle 210 together with the person 201. The UAV 220 hence does not need to fly through the downwind of aerial vehicle 210 when returning to the aerial vehicle 210.

In still further examples, the UAV 220 may be a one-way UAV, i.e. a UAV which is only used once. In this case, the UAV 220 may be left at the location of the person 201 after releasing the rope 230 from the second connection 222.

In some examples, the UAV 220 may further comprise a communication system 227 such that a communication channel can be established between the person 201 and a person in the aerial vehicle 210 (e.g. a member of the rescue team such as a medic or a paramedic). The communication system 227 may, e.g., provide voice communication or a video chat between the person 201 and the person in the aerial vehicle 210. Accordingly, the communication system 227 comprises one or more of a microphone, a loudspeaker, a video camera, etc. The communication system 227 may enable the person 201 to communicate with the person in the aerial vehicle 210. For example, the person in the aerial vehicle 210 may give instructions or place requests.

In other examples, a camera 228 of the UAV 220 captures a video including the person 201. The video is transmitted from the UAV 220 to the aerial vehicle 210. The video may be analyzed by members of the rescue team in the aerial vehicle to assess the situation or the physical condition of the person 201.

The aerial vehicle 210 and the UAV 220 may, e.g., communicate wirelessly using one or more wireless communication technologies (e.g. a cellular network or a wireless local area network). In other examples, the aerial vehicle 210 and the UAV 220 may communicate wired via one or more wires (cables) included in or attached to the rope 230. In other words, data such as control data, audio data and/or video data may be exchanged wired or wirelessly between the aerial vehicle 210 and the UAV 220. Wired communication may, e.g., be used if the UAV 220 is fixedly (i.e. in a non-releasable manner) connected to the rope 230 via the second connection 222.

According to some examples, the UAV 220 may further be supplied with electric energy from the aerial vehicle 210 via one or more wires included in or attached to the rope 230. For example, the UAV 220 may be supplied with electric energy until the UAV 220 releases the rope 230 from the second connection 222. If the UAV 220 is fixedly (i.e. in a non-releasable manner) connected to the rope 230 via the second connection 222, the UAV 220 may be permanently supplied with electric energy via the rope 230. Supplying the UAV 220 at least part-time with electric energy via the rope 230 may allow to reduce battery capacity at the UAV 220 such that weight and cost of the UAV 220 may be reduced. Further, the danger posed by the UAV may be reduced. In case of a permanent connection of the UAV 220 to the rope 230, the UAV 220 may omit a battery (i.e. not comprise a battery) due to a permanent power supply via the rope 230.

In some situations, it may be advantageous to provide the person 201 with a rescue belt or a similar device in order to enable the person 201 to safely attach to the rope 230. This may allow to avoid a lengthy procedure of putting on equipment while being connected to the aerial vehicle 210 via the rope 230. For example, the rescue belt may in addition to the rope 230 be releasably attached to the UAV 220 such that the UAV 220 delivers the rescue belt and the rope 230 to the person 201.

In alternative examples, the rescue belt is delivered by another (second) UAV to the person 201. Accordingly, the rescue belt is releasably attached to the other UAV. Similar to what is described above for the UAV 220, the other UAV is launched form aerial vehicle 210 and approaches the person 201 in order to enable the person 201 to reach the rescue belt.

It is to be noted that the rope 230 illustrated in FIGS. 2 and 3 is merely an example for a rescue device. In alternative examples, any other rescue device such as a (rope) ladder may be used instead of the rope 230. Further, although the above paragraphs refer to "a person to be rescued", it is to be noted that the proposed rescue technique is not limited to rescuing only a single person. A person skilled in the art will readily understand that the proposed technique may be used for rescuing plural persons as well.

The proposed technique provides a system to deliver and handover a rope or any other rescue device from a large air vessel such as a helicopter to people who need it. For example, the proposed technique may allow to deliver and handover a rope or any other rescue device to an open window of a building or to a steep mountain environment.

Further, the proposed technique provides a system to launch an UAV with the rope/rescue device attached thereto from a helicopter or any other air vessel. Further, the proposed technique provides a method for guiding the UAV to the person(s) to be rescued as well as a system for safely handing over the rope or the other rescue device to the person(s).

As described above, the proposed technique may include establishing a communication channel between the rescue team in the air vessel and the person(s) to be rescued.

The following examples pertain to further embodiments:
(1) A method for transporting a rescue device from an aerial vehicle to a person to be rescued, wherein the rescue device is attached to the aerial vehicle, the method comprising:
launching an unmanned aerial vehicle from the aerial vehicle, wherein an end portion of the rescue device is attached to the unmanned aerial vehicle via a first connection and a second connection, wherein the end portion of the rescue device is releasable by the person to be rescued from the first connection for handover;
approaching the person to be rescued by the unmanned aerial vehicle in order to enable the person to be rescued to reach the end portion of the rescue device;
determining at the unmanned aerial vehicle whether the end portion of the rescue device is released from the first connection;
if it is detected that the rescue device is released from the first connection, determining at the unmanned aerial vehicle whether the person to be rescued is safely attached to the rescue device; and
if it is detected that the person to be rescued is safely attached to the rescue device:
  releasing the rescue device from the second connection; or
  deactivating the unmanned aerial vehicle such that the unmanned aerial vehicle remains attached to the rescue device via the second connection.
(2) The method of (1), wherein launching the unmanned aerial vehicle from the aerial vehicle comprises:
lowering the unmanned aerial vehicle with respect to the aerial vehicle by means of the rescue device to position the unmanned aerial vehicle at a lowered position with respect to the aerial vehicle; and
launching the unmanned aerial vehicle sideways from the lowered position.
(3) The method of (2), wherein launching the unmanned aerial vehicle sideways from the lowered position comprises:
receiving information at the unmanned aerial vehicle about one or more operation parameters of the aerial vehicle;
estimating a downwind created by the aerial vehicle based on the information about the one or more operation parameters of the aerial vehicle; and
controlling movement of the unmanned aerial vehicle based on the estimated downwind.
(4) The method of any of (1) to (3), wherein the unmanned aerial vehicle comprises a human detection system, wherein approaching the person to be rescued by the unmanned aerial vehicle comprises:
detecting the person to be rescued using the human detection system;
determining by the human detection system position information about an absolute position of the person to be rescued or a relative position of the person to be rescued with respect to the unmanned aerial vehicle; and
controlling movement of the unmanned aerial vehicle based on the position information.
(5) The method of any of (1) to (4), wherein approaching the person to be rescued by the unmanned aerial vehicle comprises:
detecting by the unmanned aerial vehicle a marker indicating an emergency exit of a building; and
controlling movement of the unmanned aerial vehicle in order to approach the marker or a position indicated by the marker.
(6) The method of any of (1) to (3), wherein approaching the person to be rescued by the unmanned aerial vehicle comprises:
receiving a signal from an emergency beacon attached to the person to be rescued; and
controlling movement of the unmanned aerial vehicle based on the received signal.
(7) The method of any of (1) to (3), wherein approaching the person to be rescued by the unmanned aerial vehicle comprises:
receiving, by the unmanned aerial vehicle; control signals from a remote control; and
controlling movement of the unmanned aerial vehicle based on the control signals.
(8) The method of any of (1) to (7), wherein the unmanned aerial vehicle comprises a user input device, and wherein determining at the unmanned aerial vehicle whether the person to be rescued is safely attached to the rescue device comprises determining that the person to be rescued is safely attached to the rescue device if a user input is received at the user input device.
(9) The method of any of (1) to (8), wherein determining at the unmanned aerial vehicle whether the person to be rescued is safely attached to the rescue device comprises determining that the person to be rescued is safely attached to the rescue device comprises if an acknowledgment signal from the aerial vehicle or a remote control of the unamend aerial vehicle is received at the unmanned aerial vehicle.
(10) The method of any of (1) to (9), wherein the method further comprises establishing a communication channel between the person to be rescued and a person in the aerial vehicle via a communication system of the unmanned aerial vehicle.
(11) The method of any of (1) to (10), wherein the method further comprises:
capturing a video including the person to be rescued via a camera of the unmanned aerial vehicle; and
transmitting the video from the unmanned aerial vehicle to the aerial vehicle.
(12) The method of any of (1) to (11), wherein the aerial vehicle and the unmanned aerial vehicle communicate wirelessly.

(13) The method of any of (1) to (11), wherein the aerial vehicle and the unmanned aerial vehicle communicate wired via one or more wires included in or attached to the rescue device.

(14) The method of any of (1) to (13), wherein the method further comprises supplying the unmanned aerial vehicle with electric energy from the aerial vehicle via one or more wires included in or attached to the rescue device.

(15) The method of any of (1) to (14), wherein the method further comprises:
moving autonomously to a predefined pick-up position by the unmanned aerial vehicle after releasing the rescue device from the second connection; or
returning by the unmanned aerial vehicle to the aerial vehicle, wherein returning to the aerial vehicle comprises:
  moving to a lowered position with respect to the aerial vehicle; and
  attaching to a pick-up element of the aerial vehicle at the lowered position.

(16) The method of any of (1) to (15), wherein the rescue device is a rope.

(17) The method of (16), wherein in addition a rescue belt is releasably attached to the unmanned aerial vehicle.

(18) The method of (16), wherein the method further comprises:
launching another unmanned aerial vehicle from the aerial vehicle, wherein a rescue belt is releasably attached to the other unmanned aerial vehicle; and
approaching the person to be rescued by the unmanned aerial vehicle in order to enable the person to be rescued to reach the rescue belt.

(19) The method of any of (1) to (15), wherein the rescue device is a ladder.

(20) The method of any of (1) to (19), wherein the aerial vehicle is helicopter.

(21) The method of any of (1) to (20), wherein the unmanned aerial vehicle uses a control software for controlling movement of the unmanned aerial vehicle, wherein the control software takes into account physics of the rescue device for controlling the movement of the unmanned aerial vehicle.

(22) A rescue system for rescuing a person to be rescued, comprising:
an aerial vehicle;
a rescue device attached to the aerial vehicle; and
an unmanned aerial vehicle, wherein an end portion of the rescue device is attached to the unmanned aerial vehicle via a first connection and a second connection, wherein the end portion of the rescue device is releasable by the person to be rescued from the first connection for handover,
wherein the unmanned aerial vehicle is configured to:
  launch from the aerial vehicle;
  approach the person to be rescued in order to enable the person to be rescued to reach the end portion of the rescue device;
  determine whether the end portion of the rescue device is released from the first connection; and
  if it is detected that the rescue device is released from the first connection, determine whether the person to be rescued is safely attached to the rescue device,
if it is detected that the person to be rescued is safely attached to the rescue device, the unmanned aerial vehicle is further configured to:
  release the rescue device from the second connection; or
  deactivate itself such that the unmanned aerial vehicle remains attached to the rescue
  device via the second connection.

(23) An unmanned aerial vehicle for transporting a rescue device from an aerial vehicle to a person to be rescued, the unmanned aerial vehicle comprising:
a first connection and a second connection for attaching an end portion of the rescue device to the unmanned aerial vehicle, wherein the end portion of the rescue device is releasable by the person to be rescued from the first connection for handover; and
a processing circuit configured to control the unmanned aerial vehicle to perform the following:
  launch from the aerial vehicle;
  approach the person to be rescued in order to enable the person to be rescued to reach the end portion of the rescue device;
  determine whether the end portion of the rescue device is released from the first connection; and
  if it is detected that the rescue device is released from the first connection, determine whether the person to be rescued is safely attached to the rescue device,
wherein if it is detected that the person to be rescued is safely attached to the rescue device, the processing circuit is further configured to control the unmanned aerial vehicle to perform the following:
  release the rescue device from the second connection; or
  deactivate itself such that the unmanned aerial vehicle remains attached to the rescue
  device via the second connection.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for transporting a rescue device from an aerial vehicle to a person to be rescued, wherein the rescue device is attached to the aerial vehicle, the method comprising:
    launching an unmanned aerial vehicle from the aerial vehicle, wherein an end portion of the rescue device is attached to a first connection at a first location on the unmanned aerial vehicle and to a second connection at a second location on the unmanned aerial vehicle, wherein the end portion of the rescue device is releasable by the person to be rescued from the first connection for handover, while the end portion of the rescue device remains attached to the second connection of the unmanned aerial vehicle;
    approaching the person to be rescued by the unmanned aerial vehicle in order to enable the person to be rescued to reach the end portion of the rescue device;
    determining at the unmanned aerial vehicle whether the end portion of the rescue device is released from the first connection;
    if it is detected that the rescue device is released from the first connection, determining at the unmanned aerial vehicle whether the person to be rescued is safely attached to the rescue device; and
    if it is detected that the person to be rescued is safely attached to the rescue device:
        releasing the rescue device from the second connection; or
        deactivating the unmanned aerial vehicle such that the unmanned aerial vehicle remains attached to the rescue device via the second connection.

2. The method of claim 1, wherein launching the unmanned aerial vehicle from the aerial vehicle comprises:
    lowering the unmanned aerial vehicle with respect to the aerial vehicle by means of the rescue device to position the unmanned aerial vehicle at a lowered position with respect to the aerial vehicle; and
    launching the unmanned aerial vehicle sideways from the lowered position.

3. The method of claim 2, wherein launching the unmanned aerial vehicle sideways from the lowered position comprises:
    receiving information at the unmanned aerial vehicle about one or more operation parameters of the aerial vehicle;
    estimating a downwind created by the aerial vehicle based on the information about the one or more operation parameters of the aerial vehicle; and
    controlling movement of the unmanned aerial vehicle based on the estimated downwind.

4. The method of claim 1, wherein the unmanned aerial vehicle comprises a human detection system, wherein approaching the person to be rescued by the unmanned aerial vehicle comprises:
    detecting the person to be rescued using the human detection system;
    determining by the human detection system position information about an absolute position of the person to be rescued or a relative position of the person to be rescued with respect to the unmanned aerial vehicle; and
    controlling movement of the unmanned aerial vehicle based on the position information.

5. The method of claim 1, wherein approaching the person to be rescued by the unmanned aerial vehicle comprises:
    detecting by the unmanned aerial vehicle a marker indicating an emergency exit of a building; and
    controlling movement of the unmanned aerial vehicle in order to approach the marker or a position indicated by the marker.

6. The method of claim 1, wherein approaching the person to be rescued by the unmanned aerial vehicle comprises:
    receiving a signal from an emergency beacon attached to the person to be rescued; and
    controlling movement of the unmanned aerial vehicle based on the received signal.

7. The method of claim 1, wherein approaching the person to be rescued by the unmanned aerial vehicle comprises:
    receiving, by the unmanned aerial vehicle, control signals from a remote control; and
    controlling movement of the unmanned aerial vehicle based on the control signals.

8. The method of claim 1, wherein the unmanned aerial vehicle comprises a user input device, and wherein determining at the unmanned aerial vehicle whether the person to be rescued is safely attached to the rescue device comprises determining that the person to be rescued is safely attached to the rescue device if a user input is received at the user input device.

9. The method of claim 1, wherein determining at the unmanned aerial vehicle whether the person to be rescued is safely attached to the rescue device comprises determining that the person to be rescued is safely attached to the rescue device comprises if an acknowledgment signal from the aerial vehicle or a remote control of the unmanned aerial vehicle is received at the unmanned aerial vehicle.

10. The method of claim 1, wherein the method further comprises establishing a communication channel between the person to be rescued and a person in the aerial vehicle via a communication system of the unmanned aerial vehicle.

11. The method of claim 1, wherein the method further comprises:
    capturing a video including the person to be rescued via a camera of the unmanned aerial vehicle; and
    transmitting the video from the unmanned aerial vehicle to the aerial vehicle.

12. The method of claim 1, wherein the aerial vehicle and the unmanned aerial vehicle communicate wirelessly.

13. The method of claim 1, wherein the aerial vehicle and the unmanned aerial vehicle communicate wired via one or more wires included in or attached to the rescue device.

14. The method of claim 1, wherein the method further comprises supplying the unmanned aerial vehicle with electric energy from the aerial vehicle via one or more wires included in or attached to the rescue device.

15. The method of claim 1, wherein the method further comprises:
    moving autonomously to a predefined pick-up position by the unmanned aerial vehicle after releasing the rescue device from the second connection; or
    returning by the unmanned aerial vehicle to the aerial vehicle, wherein returning to the aerial vehicle comprises:
        moving to a lowered position with respect to the aerial vehicle; and
        attaching to a pick-up element of the aerial vehicle at the lowered position.

16. The method of claim 1, wherein the rescue device is a rope.

17. The method of claim 1, wherein the aerial vehicle is helicopter.

18. The method of claim 1, wherein the unmanned aerial vehicle uses a control software for controlling movement of the unmanned aerial vehicle, wherein the control software takes into account physics of the rescue device for controlling the movement of the unmanned aerial vehicle.

19. A rescue system for rescuing a person to be rescued, comprising:
an aerial vehicle;
a rescue device attached to the aerial vehicle; and
an unmanned aerial vehicle, wherein an end portion of the rescue device is attached to a first connection at a first location on the unmanned aerial vehicle and to a second connection at a second location on the unmanned aerial vehicle, wherein the end portion of the rescue device is releasable by the person to be rescued from the first connection for handover, while the end portion of the rescue device remains attached to the second connection of the unmanned aerial vehicle,
wherein the unmanned aerial vehicle is configured to:
launch from the aerial vehicle;
approach the person to be rescued in order to enable the person to be rescued to reach the end portion of the rescue device;
determine whether the end portion of the rescue device is released from the first connection; and
if it is detected that the rescue device is released from the first connection of the unmanned aerial vehicle, determine whether the person to be rescued is safely attached to the rescue device,
if it is detected that the person to be rescued is safely attached to the rescue device, the unmanned aerial vehicle is further configured to:
release the rescue device from the second connection; or
deactivate itself such that the unmanned aerial vehicle remains attached to the rescue device via the second connection.

20. An unmanned aerial vehicle for transporting a rescue device from an aerial vehicle to a person to be rescued, the unmanned aerial vehicle comprising:
a first connection at a first location on the unmanned aerial vehicle and a second connection at a second location on the unmanned aerial vehicle for attaching an end portion of the rescue device to the unmanned aerial vehicle, wherein the end portion of the rescue device is releasable by the person to be rescued from the first connection for handover, while the end portion of the rescue device remains attached to the second connection of the unmanned aerial vehicle; and
a processing circuit configured to control the unmanned aerial vehicle to perform the following:
launch from the aerial vehicle;
approach the person to be rescued in order to enable the person to be rescued to reach the end portion of the rescue device;
determine whether the end portion of the rescue device is released from the first connection; and
if it is detected that the rescue device is released from the first connection, determine whether the person to be rescued is safely attached to the rescue device,
wherein, if it is detected that the person to be rescued is safely attached to the rescue device, the processing circuit is further configured to control the unmanned aerial vehicle to perform the following:
release the rescue device from the second connection; or
deactivate itself such that the unmanned aerial vehicle remains attached to the rescue device via the second connection.

\* \* \* \* \*